United States Patent [19]
Beerman et al.

[11] Patent Number: 5,158,183
[45] Date of Patent: Oct. 27, 1992

[54] BUFFER SYSTEM FOR THE TEMPORARY STORAGE OF FLAT OBJECTS SUCH AS LETTERS, AND BUFFER FOR USE IN SAID BUFFER SYSTEM

[75] Inventors: Johannes H. M. Beerman, Zoetermeer; Harro M. V. Leijenhorst, Waddinxveen; Frank P. Van Pomeren, Delft; Jan F. Suringh, Rotterdam, all of Netherlands

[73] Assignee: Koninklijke PTT Nederland N.V., Netherlands

[21] Appl. No.: 609,586

[22] Filed: Nov. 6, 1990

[30] Foreign Application Priority Data

Nov. 17, 1989 [NL] Netherlands ............... 8902846

[51] Int. Cl.[5] .................... B07C 1/02; B07C 3/20
[52] U.S. Cl. .................... 209/546; 209/564; 209/584; 209/900
[58] Field of Search .................... 209/546, 563–566, 209/583, 584, 900

[56] References Cited

U.S. PATENT DOCUMENTS

| | | | |
|---|---|---|---|
| 3,889,811 | 6/1975 | Yoshimura | 209/566 X |
| 3,904,516 | 9/1975 | Chiba et al. | 209/566 |
| 4,244,672 | 1/1981 | Lund . | |
| 4,388,994 | 6/1983 | Suda et al. | 209/564 |
| 4,566,595 | 1/1986 | Fostier | 209/545 |
| 4,641,753 | 2/1987 | Tamada | 209/584 X |
| 4,921,107 | 5/1990 | Hofer | 209/564 X |
| 5,042,667 | 8/1991 | Keough | 209/584 X |

FOREIGN PATENT DOCUMENTS

| | | |
|---|---|---|
| 0144908 | 6/1985 | European Pat. Off. . |
| 1277606 | 9/1968 | Fed. Rep. of Germany . |
| 2945386 | 5/1980 | Fed. Rep. of Germany . |
| 2440785 | 6/1980 | France . |

OTHER PUBLICATIONS

"Betriebstechnik", Deutsche Bundespost, pp. 2, & 6–9.

Primary Examiner—Robert P. Olszewski
Assistant Examiner—Edward M. Wacyra
Attorney, Agent, or Firm—Frishauf, Holtz, Goodman & Woodward

[57] ABSTRACT

A buffer system for the temporary separate storage of flat articles such as letters for sorting, video coding or other postal processing, uses a buffer which acts as a mechanical RAM and contains a number of storage pockets for separate storage of articles. A conveyance system is provided by elastic clamping on an endless conveyor. The conveyance system is separately controllable in the storage pockets as a letter catchment, retainment and ejection device. Buffers are situated along a branching feed section. Letter logging signals are transmitted for every letter conveyed along the feed section and run in parallel with the branched feed section. These signals in all cases include a letter identification code assigned when the letter is fed into the system. At that stage an application control continuously makes a selection of letters which are eligible for discharge from the system. The system can readily be equipped either as a sorting system or as a video coding system.

23 Claims, 5 Drawing Sheets

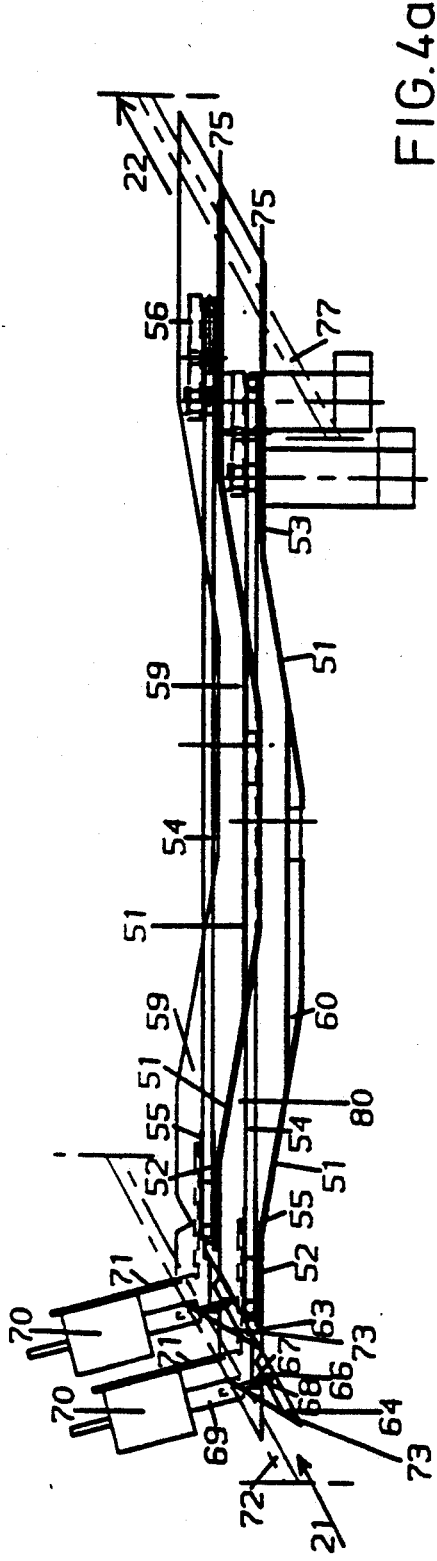

BUFFER SYSTEM FOR THE TEMPORARY STORAGE OF FLAT OBJECTS SUCH AS LETTERS, AND BUFFER FOR USE IN SAID BUFFER SYSTEM

BACKGROUND OF THE INVENTION

1. Field of the Invention

The invention is in the field of the automatic processing of flat objects such as letters.

More particularly, the invention relates to a buffer system for carrying out a buffer process comprising the feeding of flat objects, such as letters, provided with scannable symbols, in an unordered sequence, temporarily storing them and discharging them in an ordered sequence and to a buffer as storage medium in such a buffer system. An unordered and an ordered sequence is understood to mean a sequence in no way determined, and in some way determined, in or by the system. The buffer process serves the processing mentioned which may comprise, for example, a video coding process or a sorting process. The invention is therefore also directed at a video coding device and a sorting device in which such a buffer system is used.

2. Prior Art

The use of postal codes on letters in principle permits an increasingly more rapid and more precise automatic postal processing. All this is achieved by carrying out the processes such as, for example, the sorting by analogy with the treatment of data in a computer. However, such a treatment requires that throughout the entire duration of the actual processing of a number of letters which is preferably large in a sorting process, in particular the position of every letter is and remains precisely known in a control system, under the control of which the processing and the conveyance for the purpose thereof takes place. This requires a temporary storage medium with great flexibility, that is to say that every letter must be capable of being stored individually and selectively therein and then ejected at time instants which are precisely determined by the control system for the purpose of the process and on the basis of instantaneously determined selection criteria. By analogy with a (memory) buffer for the temporary storage of a character or word in a computer, such a storage medium is called a buffer or buffer system, it being possible for a buffer system to encompass more than one buffer.

Buffer is therefore understood hereinafter to mean a storage means for the temporary individual storage of objects fed along a feed track, which storage means comprises a number of buffer pockets each capable of accommodating, under the control of control means, an object from the feed track, retaining it temporarily and ejecting it in the direction of a discharge track.

German Auslegeschrift 1,277,606 discloses a letter sorting device for sorting letters at a delivery point, the letters being provided with a sorting code. This device comprises a number of storage means, sited in rows, each of the type of an intermediate stacker. Each intermediate stacker is provided at its inlet with a stacker and at its outlet with a destacker. The inlets of said intermediate stackers are connected to a feed conveyance track with branches starting from an inlet, while the outlets thereof are connected to branches, converging again into one track, of a discharge conveyance track. The feed and discharge conveyance over a row of intermediate stackers is of the driving/entraining conveyance type achieved by clamping the letters between a driven, laterally elastic, endless conveyor, and sliding surfaces sited respectively between successive inlets and outlets of the intermediate stackers. A predetermined sorting code corresponds to each intermediate stacker. Arranged near the inlet of the feed conveyance track is a sorting code reader for reading the sorting code displayed on the letters. Every letter having a particular sorting code is then passed to the intermediate stacker corresponding to that sorting code. On a signal delivered from an operating console, an intermediate stacker corresponding thereto is able to destack itself, whereupon the letters are passed in a sequence in which they were stacked in the intermediate stacker over the discharge conveyance track to the outlet of the device in order, if necessary, to be discharged as bundles at that point. A sorting device related thereto is disclosed by the U.S. Pat. No. 4,388,994. In addition to a first sorting code reader along an input track and first storage means comprising a number of intermediate stackers connected to the input track and having a common ejection conveyance track, this device also comprises second storage means formed by a row of storage locations each capable of temporarily storing a letter individually. After a first sorting in the intermediate stackers, the letters are ejected repeatedly for each intermediate stacker and fed past a second sorting code reader in the common ejection conveyance track and then, under the control of the control means, temporarily stored in a desired sequence in the row of storage locations. Finally, the letters are simultaneously released in said sequence from said storage locations for ejection along a common discharge track to the outlet of the device. For the purpose of the simultaneous ejection, the storage locations have a width which has to be greater than the maximum permitted letter length. At the inlet side of a row of storage locations, a first, single endless conveyor forming a feed track runs over the entire length. Each storage location is formed by two interacting endless conveyor belts, of which one preceding the entrance of the storage location and also running in parallel over a certain length always interacts with the endless conveyor for the purpose of conveyance in the storage location. The said endless conveyor belts separate over a certain distance (at least equal to the maximum letter length), which produces a storage space for a letter. At the end of said space there is a stop handle which can assume two positions, one in which a letter is retained, (the letter then remains in slipping contact with one of the conveyor belts,) and one in which the letter is released for further conveyance to the outlet side of the storage location by the two endless conveyor belts, which are again interacting, past the stop handle. The conveyance at the outlet side takes place in a similar way to that at the inlet side. Opposite every inlet of a storage location there are, at the other side of the conveyor, gate means which, at a command (of a control signal) can intervene in the feed track in order to route a certain letter to the storage location corresponding to the gate means. This known technique suggests as gate means those of the roller type with which the first endless conveyor is pushed in the direction of the inlet at the position of the first endless conveyor. A row of storage locations related to the second storage means from the US Patent Specification cited is disclosed by German Patent Specification No. 2,945,386. This patent specification describes a video coding system for applying a code to letters fed to the system corresponding to their address data presented on video screens. Such a code can only be applied to the letters at the outlet from the system after address data have been presented on a video terminal and a corresponding address code has then been fed to the system by human intervention. The time taken up, in particular, by said human intervention is very variable. Such a system therefore comprises a waiting section which, in said known technique, is composed of a combination of a relatively long loop in a first conveyance section and a row of storage locations for individual letters connecting thereto. If the address code of a letter which reaches the end of the loop has been fed to the system in the meantime, the letter is conveyed further in a second conveyance section in which printing means have been incorporated for printing a code corresponding to the address code supplied on the respective letter. However, if the address code has not yet been fed to the system at that time, the respective letter is fed to the row of storage locations and is stored in a free storage location having a priority assigned by the system which is highest at that instant until the address code is received by the system. A stored letter is ejected into the second conveyance section accurately harmonized in terms of time with interruptions in the flow of letters. Said interruptions occur either at the instant that a subsequent letter has to be stored or as a consequence of the temporary hold-up of the stream of letters at the beginning of the first transport section after a corresponding signal from the control system. The feed track and discharge track of this known row of storage locations are realized in a similar way to those in the technique cited above with the US Patent Specification. The actual storage location is bounded laterally by two guides sited in parallel, while the base of the storage location is formed by a permanently driven endless conveyor. Through the face of one of the guides there projects a permanently driven roller. At the inlet side, the space between the guides is openly accessible, while at the outlet side it can be shut off by a sort of barrier which is provided at the end of one arm of a two-arm lever. Mounted on the end of the other arm of the lever is a rotatable roller. The lever is rotatably mounted between two arms on a driveable shaft, as a result of which the lever can be set in two positions, one in which the barrier is closed and one in which it is opened and in which the rotatable roller and the driven roller can interact so as to convey. With the barrier closed, a letter in the buffer pocket is held upright between the guides and continuously pressed against the barrier by its own weight while making slipping contact with the permanently driven endless belt and roller. If the barrier is opened by rotating the lever, conveyance is carried out by the base conveyor and the two interacting rollers in the direction of the discharge track. Opposite every inlet there are, at the other side of the endless conveyor which determines the feed track, gate means of the roller type which, at a command (of a control signal), can intervene in the feed track in order to route a certain letter to the storage location corresponding to the gate means.

The storage techniques as known from the patent publications cited above have the following drawbacks. As used, in particular, in sorting devices, they lack the high degree of flexibility indicated above. Since, according to these storage techniques, letters are released at least once completely or virtually completely, the position of a letter is not always known equally precisely in the control system. Used for the individual storage of letters, these known techniques are unsuitable for relatively high processing speeds as a result of inadequate control of the object conveyance in the storage locations themselves; there is a relatively large occupation of space per storage location; owing to the continuous slipping contact of a stored letter with the conveyor, the storage duration can only be very limited since there is otherwise the risk that the letter becomes damaged; such a slipping contact with the bottom edge of the letter as known from the said German Offenlegungschrift may, in addition, soon lead to scores in the conveyor. The video coding system known from said Offenlegungschrift moreover also has the drawbacks that the ejection does not take place independently of the input and that during storage, the letters are not uniformly distributed over the storage locations with the result that a slanting wear may occur.

SUMMARY OF THE INVENTION

The object of the invention is to provide a highly flexible buffer system and a buffer for flat objects such as letters in which objects fed along a feed track and unordered sequentially can be stored in an individually identifiable manner and then be ejected again via a discharge track selectively and independently of the feed on the basis of selection criteria determined during storage, which buffer system and buffer do not, in addition, have the disadvantages mentioned of the known techniques. A buffer system for carrying out a buffer process comprising feeding flat objects, such as letters, provided with scannable symbols, in an unordered sequence, temporarily storing them and discharging them in an ordered sequence, which buffer system comprises storage means for temporarily storing the objects fed in, a main feed track along which objects are fed from a system inlet in the direction of the storage means, a main discharge track along which the objects are discharged from the storage means in the direction of a system outlet, system control means for controlling the carrying out of the buffer process, object signalling means incorporated at the system inlet which send object signals to the control means via an object signal connection from each object fed via the system inlet, is according to the invention, for this purpose, characterized in that the storage means are equipped for receiving, temporarily retaining and ejecting every object individually; and in that the system control means comprise storage control means for controlling the storage means, process control means for continuously determining which objects are fed, stored and discharged, first and second process signal connections which connect the process control means to the storage control means; the process control means receiving the object signals, assigning an object identification code to each object on receiving the associated object signals, compiling object logging signals and transmitting them via the first process signal connections, which object logging signals contain the object identification code of an object which has to be stored, and compiling process control signals and transmitting them over the second process signal connections, which process control signals contain the object identification code of each object which has to be discharged, and the storage control means causing objects to be stored in the storage means in an individually identifiable manner on receipt of object logging signals received via the first process signal connections, and causing the objects stored therein in an individually identifiable manner to be discharged on the basis of the process control signals received via the second process signal connections.

A further object of the invention is to provide a buffer system for (at least internally) identifiable flat objects which, even with a very large storage capacity, has a clear control using a certain form of the principle of distributive control, which is known per se. For this purpose, in a preferred embodiment, the invention is characterized in that the storage means comprise a number of buffers which are each provided with a buffer feed track connected to the main feed track, a number of individually controllable buffer pockets, and a buffer discharge track connected to the main discharge track, the storage control means comprise buffer control means for each buffer, under the control of which the buffer pockets of the associated buffer are able to receive an object from the buffer feed track, temporarily retain it and eject it in the direction of the buffer discharge track, the main feed track comprises one or more branches to which the buffers are connected by means of their respective buffer feed tracks, a branch gate corresponds to each branch in the main feed track and a buffer gate corresponds to each connection of the buffer feed track, with which gates objects can be selectively deflected towards the desired branch of the main feed track or in the direction of the associated buffer feed track respectively, a gate control is appended to each branch gate and each buffer gate, the first process signal connections connect each gate control, on the one hand, to the gate control of the branch gate located immediately upstream in the main feed track or to the process control means if the gate is the first gate as viewed from the system inlet, and on the other hand, to the gate controls or the gate control and the buffer control means of the gates or gate and buffer situated immediately downstream in each of the gate directions, the second process signal connections connect the process control means to the buffer control means of each buffer, each gate control causing the gate to be set, on the basis of object logging signals containing an object identification code of a subsequent object approaching the gate downstream and received via the first process signal connections, in a certain gate position for said object, and sending the object logging signals relating to said object further via the first process signal connections in a direction corresponding to said gate position.

As long as an object is in the buffer system, it is uniquely identifiable with the aid of the object identification code assigned at the system entrance. Said code is therefore incorporated in the object logging signal for the purpose of storage. As already seen this code is also used for the purpose of discharging the object, to which end it is included in the first process control signals. Only from the set of object identification codes of the instantaneously stored objects the object identification codes can be selected in order to cause the discharge of the corresponding stored objects. For this purpose, the buffer system preferably has the characteristic as in Claim 3.

The transit times which the objects require to reach the system outlet from their storage locations in general vary very considerably. In order, nevertheless, to be able to achieve a desired sequence at the outlet, the buffer system preferably has, in addition, the characteristic according to Claim 4.

In a storage system of some size it is best to ensure that the objects are distributed evenly over the buffers so that loading and wear of conveyance and storage means take place as evenly as possible in the buffers. Two methods of approach are preferred in this connection. According to the first method, said distribution is carried out by always choosing the direction of conveyance again at every gating point in the conveyance track on the basis of the instantaneous storage capacity in each of the gating directions. For this purpose, the buffer system is preferably characterized according to Claim 5. The second method of approach is carried out on the basis of a reservation principle, for which purpose the buffer system has the characteristic according to Claim 7.

The buffer system becomes a sorting system if, from the objects instantaneously stored in the buffer system, a selection is always made of objects which have to be discharged in a continuous row and, within said selection, the sequence is determined in which said objects have to appear at the outlet. For this purpose, the buffer system preferably has the characteristic according to Claim 10.

In the above, flexible indicates, on the one hand, the discharge process which can easily be adapted with respect to the sequence and the time span in which stored letters have to appear at the system outlet as a function of external signals (these include not only signals fed in by the attendant staff via a system control console but also signals derived from the letters fed into the system, for example those related to certain address features). On the other hand, flexible indicates the ability to anticipate changes in the availability of parts of the storage system when faults occur or are eliminated, so that the system continues to operate, albeit with reduced or increased storage capacity but with constant throughput capacity.

The object of the invention is furthermore to provide the buffer system according to the invention with a buffer in which the position of each object fed in is always well defined, i.e. the object is not released at any point during the temporary storage process. For this purpose, the buffer for the temporary individual storage of flat objects such as letters and the like, suitable for a buffer system according to one of the Claims 2 to 10 inclusive, comprising a feed track, a number of deflection devices, a corresponding number of associated buffer pockets and a discharge track, and buffer control means, for respectively feeding said flat objects, deflecting them from the feed track in the direction of the respective accociated buffer pocket, temporarily storing them and discharging them under the control of said buffer control means, is, according to the invention, characterized in that every pocket is provided with confining conveyance means which are individually controllable by the buffer control means and which, while continuously confining, accept an object, presented via a deflection device from the feed track to the corresponding buffer pocket, decelerate it, stop it and retain it for the temporary storage, and bring said object up to speed again to discharge it from the buffer pocket and present it to the discharge track. The confining conveyance means mentioned may be either shape-locked, i.e. the shape determines the position of an object confined therein, or force-locked, i.e. forces determine the position of an object confined therein. The force-locked confinement is preferably carried out by lateral clamping.

Moreover, the object of the invention is to provide a buffer for the individual storage of flat objects in which every waiting position and preferably also the feed conveyance system is such that close packing of waiting positions is possible and the feed conveyance system occupies little additional volume, that is to say a buffer having a very favourable ratio of the number of waiting positions per net volume. Preferred embodiments aimed at this have the characteristics according to the further Claims 13 to 19 inclusive.

The invention thus provides the possibility of achieving a reliable and very compact storage medium which has a large capacity for temporarily storing individual flat objects and which can operate as what may be called a mechanical RAM (Random Access Memory).

Such a storage medium has the great advantage that the structure is no longer dependent on the processing the objects have to undergo and for the purpose of which the objects have to be temporarily stored, as is the case in the techniques cited, but in particular, in the sorting device known from the US Patent Specification mentioned.

In addition, the invention has the object of providing a video coding system which does not have the above-mentioned drawbacks as a result of arranging for the function of the waiting section to be carried out with the aid of a buffer system according to the invention. For this purpose, the video coding system is preferably as described in Claim 22 or 23.

REFERENCES (1) German Auslegeschrift No. 1,277,606 Title: Verteilförderanlage für mit abtastbaren Sortiermarkmalen versehene flache Sendungen, wie insbesondere Postsendungen (Distribution and conveyance system for flat consignments, such as in particular postal consignments, provided with scannable sorting features).

(2) U.S. Pat. No. 4,388,994 Title: Flat-article sorting apparatus.

(3) German Offenlegungsschrift No. 2,945,386 Title: Vorrichtung zum Bedrucken von Postsendungen mit einer codierten oder uncodierten Postleitzahl (Equipment for printing a coded or uncoded postal code on postal consignments).

(4) European Patent Specification EP 0,144,908 Title: Machine de tri à débit amélioré (Sorting machine with improved flowrate).

(5) Federal German Post Office: "Betriebstechnik, Förder- und Verteilanlagen für Briefe, Pakete und Päckchen" (Operating technique, conveyance and distribution system for letters, parcels and packets), published by the Federal German Ministry for Postal and Telecommunication Services, Bonn 1984, pages 6–9.

SHORT DESCRIPTION OF THE DRAWING

The invention will be explained in greater detail with reference to a drawing, in which:

FIG. 1: shows a diagrammatic overview of a buffer system according to the invention;

FIG. 2: shows a diagrammatic overview of the conveyance section of the storage medium;

FIG. 3: shows a diagrammatic overview of a buffer;

FIG. 4a: shows, in plan view, a diagrammatic representation of a buffer pocket;

FIG. 4b: shows a side elevation of the buffer pocket of FIG. 4a;

FIG. 4c: shows, in plan view, the buffer pocket entrance;

FIG. 5: shows a diagrammatic representation of a distributed control of a storage medium as in FIG. 2;

FIG. 6: shows a diagrammatic representation of the processing structure of a buffer control.

DESCRIPTION OF EXEMPLARY EMBODIMENTS

Although the invention is in principle suitable for use in systems in which the temporary, separate storage of individually identifiable, essentially flat objects associated with certain rigidity limits is necessary, it will be explained with reference to systems which are suitable for letter post processing. More particularly, two buffer systems according to the invention will be described, one suitable for sorting letters and one suitable for video coding letters. But first of all, what is common in both systems will be described.

1. Diagrammatic overview of a buffer system

Figure 1:
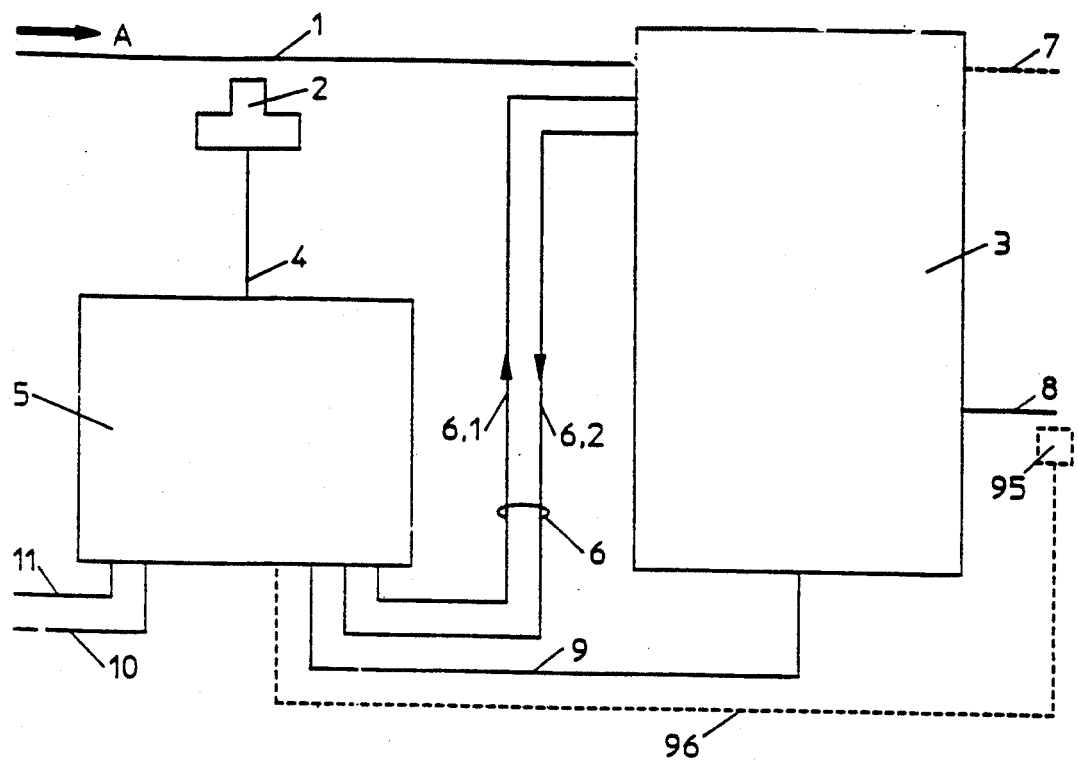

FIG. 1 shows a diagrammatic overview of a buffer system according to the invention. Letters from a system entrance (for example, a stack removal device; not shown) are fed in the direction shown by arrow A via a main feed track 1 past sensing means 2 to a storage medium 3 for temporary storage. The sensing means 2 transmit, via an object signal connection 4, object signals BS to an application control device 5, hereinafter also designated as application control. In the control device 5, a unique internal code BIC is assigned to the object signals BS of each letter. The code BIC is first of all incorporated in letter logging signals BBS which are associated with said letter and which are transmitted in parallel with the conveyance of the letter along the main feed track 1 over a forward path 6.1 of a first process signal connection 6 (designed in duplex form) to the storage medium 3. When a letter has in fact been stored in the storage medium 3 or, if there is a lack of storage capacity, has been directed to an overflow exit 7 of the storage medium 3, letter storage indication signals BOIS are sent back from the storage medium 3 via a return path 6.2 of the first process signal connection 6 to the application control device 5. The letter storage indication signals BOIS contain, in addition to the letter identification code BIC, at least an indication of whether the respective letter has been stored or has left the storage medium 3 via the overflow exit 7. If a letter having a certain BIC does not overflow, certain letter data BD of said letter, derived from the object signals and/or the letter storage indication signals BOIS, are stored together with their BIC in the application control device 5. On the basis of the letter data BD, said device then determines when said letter, seen in relation to other stored letters, has to be discharged from the storage medium 3. Instructions to this effect are transmitted to the storage medium 3, together with the letter identification codes BIC and the sequence in which the letters to be ejected into a main discharge track 8 at the exit of the storage medium 3, over a second process signal connection 9 between the application control device 5 and the storage medium 3. The application control also has furthermore two control entrances, one for local control 10, for example for giving instructions from an operating console, and one for external control 11 via which signalling is possible, for example originating from other letter processing equipment interacting with the buffer system.

The conveyance of letters along the main feed track 1, the overflow exit 7 and the main discharge track 8 is carried out by means known per se such as, for example, with pairs of interacting endless conveyor belts (see below).

If a sorting system is involved, the sensing means 2 may comprise a reading head for recording a number of letter data of letters which pass in succession, such as the post code of the addressee and the length of the letter.

If a video coding system is involved, the sensing means may be formed, for example, by a video camera which senses video image signals of letters which pass and, under the control of the application control device 5, sends them to video image stations (not shown).

The application control device 5 comprises, as will be described in more detail below, a processor which is capable of executing a number of control programs which form the actual operating process for the purpose of storing and discharging letters, also called the buffer process. The nature of the programs essentially determines the purpose for which the storage medium can be used, with the result that the whole may operate, for example, as a sorting system or as a video coding system. The actual operating process is preceded by an initiating process during which the application control determines how many waiting locations the storage medium 3 comprises or how many are available for the operating process.

2. Diagrammatic overview of the conveyance section of the storage medium

Figure 2:
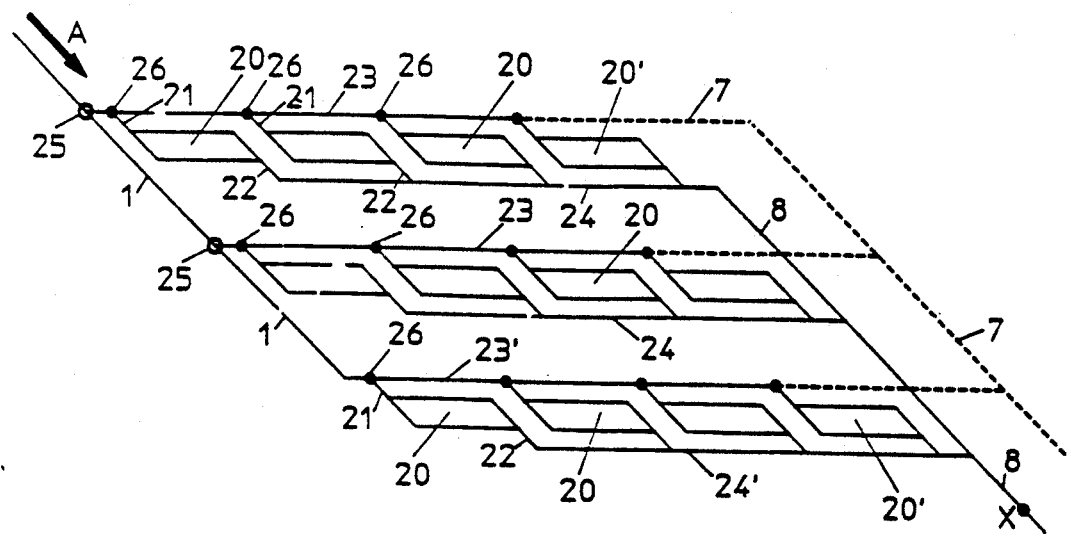

FIG. 2 shows diagrammatically the storage medium 3. It comprises a number of preferably identical buffers 20 according to the invention, each with a buffer feed track 21 and a buffer discharge track 22. By way of example, twelve arranged in a 3 by 4 arrangement are situated along and connected to a conveyance system formed by the main feed track 1, three feed branches 23 which form side branches of the main feed track 1, the main discharge track 8, three discharge branches 24 which form side branches of the main discharge track 8, and the overflow exit 7 onto which the feed branches 23 debouch. Each buffer 20 is connected by means of its buffer feed track 21 to a feed branch 23 and is connected by means of its buffer discharge track 22 to a discharge branch 24. At the point where the feed branches 23 branch off from the main feed track 1, there are branch gates 25 for deflecting the conveyance from the main feed track 1 to the feed branches 23. At the point where the buffer feed tracks 21 join the feed branches 23, there are buffer gates 26 for deflecting the conveyance from the feed branches 23 to the buffer feed tracks 21. If conveyance in a feed branch 23 is not deflected, it debouches into the overflow exit 7. Located in the main discharge track 8, past the point where the last discharge branch 24' debouches in it, is a well-defined ejection point X determined, for example, by the presence of photo-detection means. Time indications are related to said ejection point X during the operating process for the purpose of discharging letters.

3. Diagrammatic overview of a buffer

Figure 3:
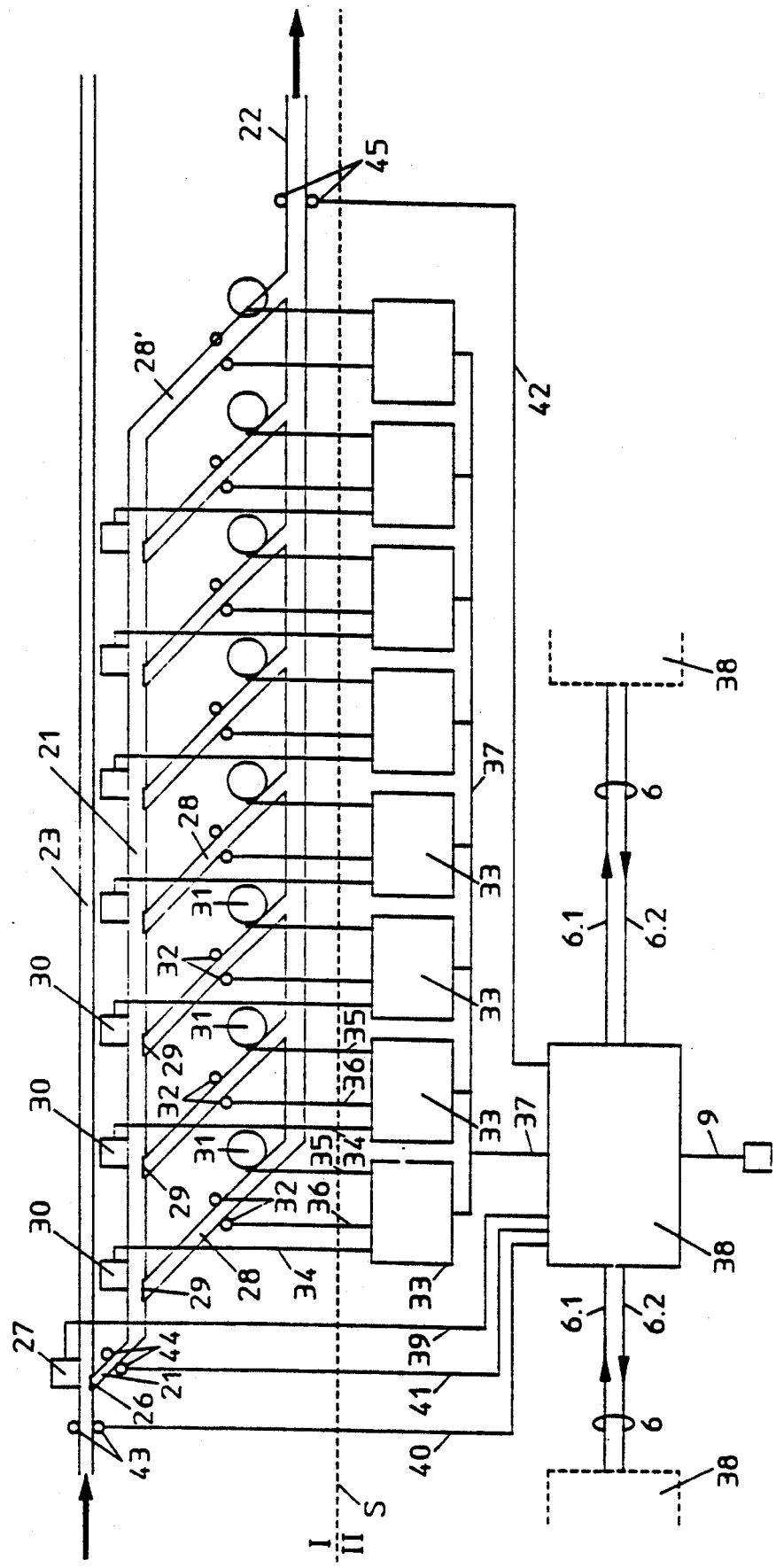

FIG. 3 shows diagrammatically the structure of a buffer 20 with the actual conveyance section above (I) a dotted line S and the control section below it (II). The buffer is connected to a feed branch 23 by means of its buffer feed track 21. Located at the connecting point is the buffer gate 26 with, for example, a gate solenoid as gate drive 27. The buffer feed track 21 leads past a number of storage points 28, also called pockets, in this exemplary embodiment eight in number, each equipped for individually storing a letter. A letter can be fed into a pocket 28 from the buffer feed track 21 by a pocket gate 29 with a gate drive 30 at each pocket entrance. A letter can be accommodated in each pocket, retained and ejected again with means (not shown; see below and in FIG. 4) driven by a motor 31. Every pocket 28 is furthermore provided with photo detection means 32 in order to be able to detect the presence of a letter in a pocket 28. Each pocket has its own pocket control 33 which has signal connections via control lines 34, 35 and detection line 36 to the gate drive 30, the motor 31 and the photodetection means 32 for controlling the pocket. All the pocket controls 33 of the buffer are connected to a buffer control 38 via a common signal bus 37. The buffer control furthermore also has a control line connection 39 internally to the drive 27 of the buffer gate 26, and detection line connections 40, 41 and 42 to photodetection means 43, 44 and 45 respectively at the entrance of the buffer on either side of the buffer gate 26 and at the exit of the buffer in the buffer discharge track 22. Each buffer control 38 is connected to the process signal connections 6 downstream (forward path 6.1) to a buffer control of a buffer, if present, situated immediately downstream in the letter conveyance and upstream (return path 6.2) to a buffer or branch gate control of a buffer 20 or branch gate 25 situated immediately upstream in the letter conveyance.

4. The buffer pocket

FIG. 3 shows diagrammatically a buffer having only 8 pockets. In principle, however, this number can be chosen to be as large as desired, depending on the application. In an operational system, a buffer will comprise, for example, 16, but preferably 32 or even 64 pockets. The construction of a pocket 28, which will be described below in detail with reference to FIG. 4, is therefore such that the invention provides a very compact continuous row of parallel pockets, each pocket of which adjoins the buffer feed track 21 at a suitably chosen angle, in this case 30°.

Figure 4C:
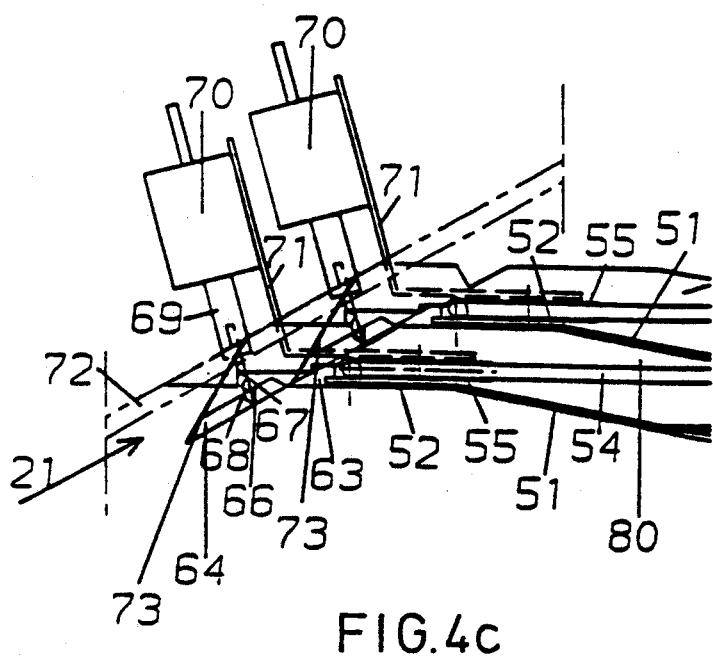

FIG. 4 shows a buffer pocket, namely in section (a) in a plan view, in section (b) in a side elevation and in section (c) in greater detail, the input of each pocket in plan view. Each pocket comprises two identical walls 51 which are offset slightly with respect to each other and have a somewhat concave/convex profile when viewed in longitudinal section and of which the flat ends 52 and 53 which respectively adjoin the buffer feed track 21 and the buffer discharge track 22 again lie approximately in the same plane. The pockets adjoin one another in such a manner that every wall 51 is the dividing wall of two consecutive pockets. Over the concave side formed between the flat ends 52 and 53, an endless elastic conveyor cord 54 is stretched more or less rectangularly over four flat conveyor wheels 55, fitted in pairs on the flat ends 52 and 53. One of the conveyor wheels 55' can be driven as a result of a rigid coaxial coupling to a drive wheel 56 over which a drive cord 57 runs to a motor 58 (N.B. this corresponds to motor 31 in FIG. 3). The drive is carried out in a manner such that a forward section 54a (upper side of the rectangle) of the conveyor cord 54 is driven in a direction which corresponds to the conveyance directions in the buffer feed and discharge tracks 21 and 22. The return section 54b (lower side of the rectangle) of the conveyor cord 54 and the drive (motor 58, drive cord 57, the drive wheel 56 and the conveyor wheel 55') are located below a strip 59 which serves as base plate inside the pocket and which is vertically mounted on each wall 51 in parallel with the forward section 54a of the conveyor cord. Fitted at the back of said concave side, that is to say at the convex side, of each wall 51 is a sliding block 60 which is provided with a channel 61 which is able to accommodate the forward section 54a of a conveyor cord 54 on an adjacent wall 51. At the side where the pocket adjoins the buffer feed track 21, the wall 51 is extended by means of a flat section 62 comprising an intermediate section 63 rigidly joined at one side to the wall and an end section 64 rotatably joined, preferably by means of an elastic hinge 65, to the other side of the intermediate section 63. Said end section 64 comprises two parts, one wider part 64a above the base plate strip 59 and a narrower extension 64b. Said narrower extension 64b is joined via a yoke 68 coupled at two sides by means of elastic hinges 66 and 67 to the driving end 69 of a plunger-type solenoid 70. As a result of this connection, the wider part 64a is able to act as a gate vane. For this reason, said part 64a is also designated hereinafter as gate vane part or gate vane for short (and corresponds to the pocket gate 29 in FIG. 3, while the plunger-type solenoid 70 with its driving end 69 corresponds to the pocket gate drive 30). With the plunger-type solenoid 70 in an inactivated state, said broader part has a position in which said part is approximately parallel to the buffer feed track 21 and closes off the entrance of the pocket in this position. In the activated state of the plunger-type solenoid 70, said part 64a is approximately parallel to the plane in which the conveyor cord 54 is stretched and the pocket is opened. The plunger-type solenoid is fitted on an angular support 71 which is mounted in its turn under the base plate strip 59 at the flat end 52 of the wall 51. Conveyance in the buffer feed track 21 is brought about by a number, in this case 3, of endless conveyor cords 72 which are able to interact to produce conveyance with flexible elastic flaps 73 fitted on the end of the gate vane part 64a between recesses 74. In the closed state of the gate vane part 64a, said flaps project at an angle of approximately 30° to a small extent through the plane of the conveyor cords 72. They are therefore able to deliver that normal force which is necessary to bring about a sliding/entraining conveyance of letters which are located in the buffer feed track 21 between the endless conveyor cords 72 and the flaps 73. In the opened state, as a result of the presence of the recesses 74 the gate vane part 64a is able to intervene as a counter current gate in said sliding/entraining conveyance and feed a letter from the buffer feed track 21 into the pocket.

At the buffer discharge track 22 side, the conveyance is also of the sliding/entraining type. At this side, similar flexible elastic flaps 75 are fitted directly above the base plate strip 59 on, and in line with, the flat end 53 of the wall 51. Each flap is provided with recesses 76 for accommodating an equal number of endless conveyor cords 77 in the buffer discharge track 22.

The sliding block 60 may in principle extend over the entire height of the convex side of the wall 51 above the base plate strip 59, but it may also be constructed, as is indicated in the Figure, in the form of a number of parallel strips. Said strips of the sliding block 60 have a somewhat trapezoidal longitudinal section which flushly adjoins the concave/convex profile of the wall 51 so that the leading edge of a letter fed into the pocket from the buffer feed track 21 is able to slide unhindered between the sliding block 60 and the pocket conveyor cord 54. The strips of the sliding block 60 situated lower down are interrupted in order to provide a recessed space 78 (broken dash line) for a printed circuit board (not shown) on which the photodetection means 32 already indicated in FIG. 3 are fitted. This board carries a light-emitting cell on the one side and a light-sensitive cell on the other side at a mutual distance essentially equal to the distance over which the walls 51 of the pocket are arranged in a mutually offset fashion. Every board is mounted in the space 78 in a manner such that a light beam from its emitting cell is able to fall through an opening 79 in the wall 51 on the light-sensitive cell of the board in an adjacent pocket.

If a letter which is approaching along the buffer feed track 21 has to be stored in a pocket determined by the buffer control, the gate vane 64a is first set in the open position by energizing the plunger-type solenoid 70, as a result of which the letter can be deflected from the feed track 21 in the direction of the pocket. In the meantime, the pocket conveyor cord 54 is also brought up to speed by means of energizing the motor 58 which corresponds to the conveyance speed in the feed track 21 so that, as soon as the leading edge of a deflected letter is pushed into a notch 80 between wall 51, or sliding block 60, and pocket conveyor cord 54, the letter is taken over by a sliding/entraining conveyance between sliding block 60 and pocket conveyor cord 54 running at the same speed. Said sliding/entraining conveyance in the pocket is first decelerated and then stopped after the pocket photodetection means 32 detect an interruption of the abovementioned light beam. This deceleration takes place in a defined way, in particular to avoid slipping of the letter, as a result of which the position of the letter in the pocket is less well defined. For the same reason, when a letter has to be discharged, the conveyor cord 54 is gradually brought up to the speed which corresponds to that of the conveyance in the buffer discharge track 22. Thus, as soon as the leading edge of the letter reaches the endless conveyor cords 77 of the buffer discharge track 22 and is pushed into the notch between said cords and the flaps 75, the letter can again be smoothly transferred to the sliding/entraining conveyance of the buffer discharge track 22. The pocket conveyor cord 54 is stopped after the detection means 32 of the respective pocket detect light again. To bring about a good sliding/entraining conveyance, the conveyor cords must be manufactured from a material which is not only elastic but also has a high coefficient of friction, for example Polycord. The material of the sliding block and sliding flaps should at the same time have a very low coefficient of friction, for example nylon. Nylon can equally be chosen for the wall, with the result that the whole of the wall 51, the base plate strip 59 and flaps 75 can be manufactured as one injection-moulded part. The flat part 62, including gate vane part 64a and yoke 68, can also be manufactured from one piece, for example from polypropylene, in which the elastic hinges 65, 66 and 67 can suitably be provided.

In order to achieve a well defined deceleration and acceleration of the pocket conveyor cord 54 respectively for feeding and discharging a letter, use can be made of a motor with a control which is capable of passing through a fixed deceleration or acceleration curve with minimum deviation. A commercially available DC motor having a digital encoder which is regulated as servo unit can be chosen for this purpose. The distance between the end of the clamping of a letter by the gliding/entraining conveyance in the feed track 21 and the beginning of the clamping by the one in the pocket, and the distance between the end of the clamping in the pocket and the beginning of the one in the discharge track 22 is smaller than the minimum letter length in the system and preferably not greater than three-quarters thereof. With a permitted letter thickness of up to 2 mm, the walls of the pockets can be placed at a mutual distance of only 15 mm.

The sliding/entraining conveyance described here is able to process letters at a speed of up to 1.5 m/sec with certainty.

5. The control of the buffer system

The individual units of the system, namely a buffer 20 including its buffer gate 26, and a branch gate 25, also a storage medium 3 of a buffer system as a whole (FIG. 1), are in principle of modular construction. They each have their own control. Coupled by means of communication channels, in this case the common signal bus 37 inside a buffer 20, and the first and second process signal connections 6 and 9, said own controls form a distributed control for a buffer system. Each control of such an individual unit has three different tasks:

control of the electro/mechanical components;

the taking of decisions for the purpose of the distributed control; and communication with other units of the system.

Inside a buffer, each pocket with its control also forms a modular unit, albeit that the control is simpler since it operates in a slave relationship with the buffer control.

Although buffer systems according to the invention can in principle be coupled to larger systems, the description of the distributed control below is restricted to that of a single buffer system.

The communication between the application control and the distributed control of the buffer system comprises the following types of messages:

messages for the purpose of the buffer system initiating process; see below;

messages necessary for introducing letters into the storage medium; these comprise the letter logging signals BBS and the letter storage indication signals BOIS;

messages necessary for ejecting letters from the storage medium; these comprise the instructions, already mentioned, with letter identification codes BIC of letters to be discharged and their desired sequence of appearance at the exit from the storage medium 3;

messages as a consequence of fault situations.

5.1. Control of the storage medium

Figure 5:
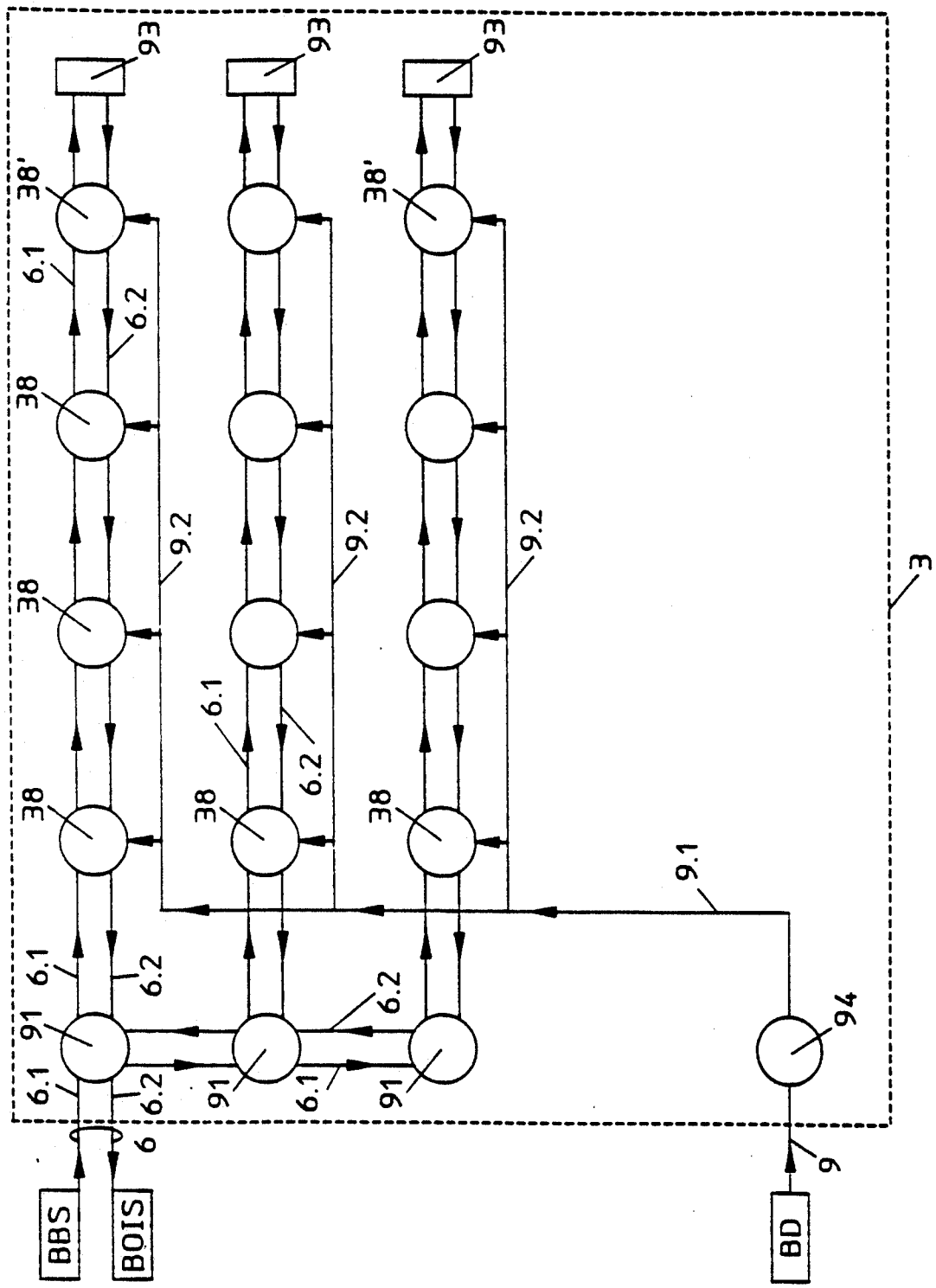

FIG. 5 shows diagrammatically a distributed control up to buffer level depicted for the storage medium 3 which has a conveyance section as shown diagrammatically in FIG. 2. A branch gate control 91 has been added to each branch gate 25 and a buffer control 38 has been added to each buffer 20 including the associated buffer gate 26. Said branch gate control 91 and buffer controls 38 are incorporated in accordance with a branched structure, which corresponds to the feed conveyance, namely along the main feed track 1 and feed branches 23, in the first process signal connection 6, forward part 6.1 and return part 6.2. At the end of each side branch in this connection structure, the first process signal connection 6 is terminated with means 93 for end of branch detection. This is a termination such that it connects the serial exit (that is to say via forward path 6.1) of the last buffer control 38 in the side branch to its own entrance (that is to say via return path 6.2). The second process signal connection 9 also has a branched structure inside the storage medium with a main branch 9.1 and side branches 9.2. In said side branches 9.2, which have again been chosen to correspond with the side branches 23 in the feed conveyance, the buffer controls 38 also have a connection to the second process signal connection 9. The main branch incorporates a product control 94, the function of which will be explained later, for each storage medium 3 even before the first side branch. All process signal connections are constructed as asynchronous communication channels according to the V.24 protocol.

Messages despatched via said asynchronous communication channels have a record structure, opened and closed by unique start and stop codes, and within the record, have one or more fields, for example a message code which indicates the type of message and further parameters which are associated with said code. In the description below of the message exchange during the initiation process and the buffer process (see E.5.7 and E.5.8 respectively), use will be made of the signs < and > to differentiate the start and stop codes and the various fields inside a record.

All the controls, namely the branch gate controls, the buffer controls and the product control are provided by microprocessors with associated ROM in which the necessary software has been stored for carrying out the buffer process.

5.2 The application control

The application control comprises a number of processes including:

an input logging process K having the tasks:
receiving the object signals BS,
assigning the letter identification code BIC,
assembling and transmitting the letter logging signals BBS,
determining on the basis of receiving letter storage indication signals BOIS that a letter has actually been stored,
determining that a letter is ready for sequence determination for the purpose of discharge and placing the BIC of said letter in a discharge table AT,
an ordering process L which, on the basis of certain criteria, brings about an ordering of the letter identification codes BIC in the table AT of currently stored letters which are already ready for discharge,
a product selection process M which selects the BICs, from this table AT, of letters which, after discharge in a determined sequence, have to pass the ejection point X in the main discharge part 8 of the storage medium 3.

The application control may also comprise a so-called strategy process with which it is also possible to control the product selection process by influencing it from outside via two control entrances 10 and 11.

5.3 The product control

The application control determines, in the product selection process M, which letters have to be ejected in which sequence. These data are transmitted in message form over the second process signal connection 9 to the storage medium 3 and received in the product control 94. Said product control has the following tasks:

receiving messages containing data of letters to be ejected and of the sequence in which they have to appear at the exit from the storage medium;

calculating, on the basis of the sequence data, the instant in time TI at which each letter has to appear at the ejection point X in the main discharge track 8 of the storage medium 3;

transmitting messages containing one or more letter identification codes BIC and their associated time instant TI of letters to be ejected to all the buffer controls 38 in the storage medium 3 via the main and side branches 9.1 and 9.2 of the unidirectional second process signal connection 9.

5.4 Branch gate control

The branch gate control 91 only has tasks which relate to the input of letters. These are:

receiving, carrying out and transmitting instructions and sending back data relating to the initiation process; in this connection, the maximum number of pockets which are available in total in the buffers situated downstream is determined in each of the two gate directions; (see E.5.7 The initiation process below);

receiving, carrying out and transmitting messages and sending back data relating to the actual operating process (see also E.5.8 Message exchange during the buffer process below).

5.5 Buffer control

Figure 6:
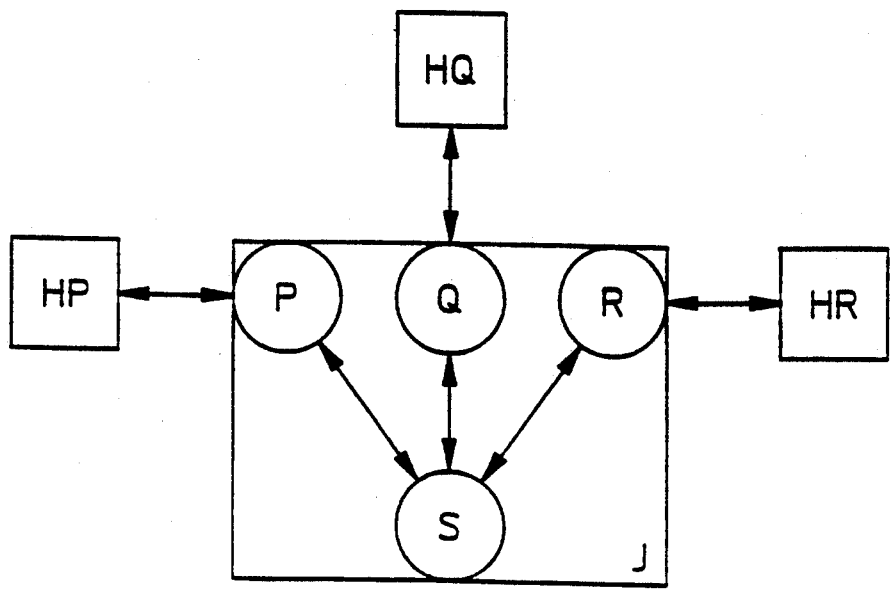

The distributed control inside a buffer up to pocket level has already been sketched above on the basis of the section (II) below the broken line S of FIG. 3. The buffer control 38 from the latter is once more shown diagrammatically in FIG. 6 for the purpose of describing the processes which are carried out by said control. Seen in terms of process, said control comprises a number of slave processes which operate in parallel and which are controlled by a master process. Said processes are installed as softward in a ROM of the microprocessor of the buffer control. These common processes are called the buffer control process (N.B. not the be confused with the buffer process) designated by the letter J. Said buffer control process J is indicated diagrammatically in FIG. 6 by a rectangle containing the sub-processes indicated by circles P, Q, R and S. P, Q and R denote the slave processes which provide for the communication with the respective hardward indicated by HP, HQ and HR. In this connection, a distinction is made in accordance with the different parts of the hardward which are activated by said processes:

process P regulates the progress of the letters on entering the buffer and comprises, for this purpose, the following tasks:

controlling the buffer gate 26 associated with the respective buffer 20 by activating the buffer gate drive 27 at the correct instant;

detection of the feeding of letters into the buffer feed track 21 and the discharge of letters into the buffer discharge track 22 with the aid of the buffer photodetection means 43, 44 and 45 respectively;

HP therefore comprises the buffer gate drive 27 and the buffer photodetection means 43, 44 and 45 (see FIG. 3);

process Q provides the communication with other control components of the storage medium 3 and comprises, for this purpose, the following tasks:

the exchange of messages over the bidirectional first process signal connections 6, namely: downstream along the forward path 6.1:

receiving messages containing letter data BD of letters which are at that instant in the feed branch 23 upstream of the buffer gate 26;

sending messages with letter data BD of letters which have been fed further towards the next buffer gate 26 in the feed branch 23, to the next buffer control 38 in the same feed branch 23; upstream along the return path 6.2:

transmitting, or receiving and forwarding, a signal that a particular letter has been stored in one of its own pockets 28 or in a pocket 28 in a buffer 20 situated further downstream; such a signal is ultimately intended for the application control device 5;

transmitting, or receiving and forwarding, a signal that a pocket in its own buffer or in a buffer situated further downstream is free to store a letter; such a signal is ultimately intended for the application control device 5;

transmitting, or forwarding, fault signals; these signals are also ultimately intended for the application control device 5;

receiving messages via main branch 9.1 and side branch 9.2 from the unidirectional second process signal connection 9 originating from the product control 94, which messages include letter data BD on which letters have to be ejected and at what time instant (TI) they have to appear at the exit;

HQ thus comprises a buffer control 38 or branch gate control 91 prior to the present buffer control, a subsequent buffer control or end of branch detection means 93, and the product control 94 (see FIG. 5);

process R provides the control of the pockets by communication with the pocket controls 33 via the common signal bus 37 and comprises the following tasks:

giving an instruction to the pocket control of an empty pocket to receive a letter;

receiving and processing the signal from a pocket control that a certain letter has or has not arrived in the pocket;

giving an instruction to the pocket control of a full pocket to discharge the letter;

receiving and processing the signal that a certain letter has or has not left a pocket;

HR therefore comprises all the pocket controls 33 connected to the common signal bus 37 (see FIG. 3).

Process S is the master process. This process provides a particular strategy in dealing with the tasks of its own or of some slave process and, for this purpose, comprises the following tasks:

deciding on the basis of a number of data—such as the number of buffers still situated downstream, the instantaneous number of empty pockets in the latter—whether a letter approaching the buffer gate (detected at that instant by photodetection means 43) is fed into the buffer;

selecting an empty pocket from a number of empty pockets so that the workload for all the pockets in the buffer is evenly distributed;

keeping up to date with which letters are stored in which pockets;

calculating the time instant at which a letter to be discharged has to be ejected from a pocket on the basis of the messages, received from the product control, containing letter data and time indications (BD and TI) and containing synchronization data obtained during the initiation process (such as length and speed of the discharge path, applicable to the present buffer, up to the exit from the storage medium);

dealing with or transmitting any faults which occur.

The common signal bus 37 with which the pocket controls 33 are connected to the buffer control 38 has a parallel-connected section B1 which runs to each pocket control and a serial-connected section B2 (not shown) which is disconnected at the site of each pocket control. The chosen bus protocol is such that the buffer control is always the bus master. The parallel section B1 is always used by the buffer control for giving the various types of commands intended for one or more pocket controls. The distinction between the various pockets is made during the initiation phase. The serial-connected section of the bus is used for this purpose.

If photodetection means are also sited downstream of every buffer gate 26 in the feed branch and the process P is correspondingly extended, it is possible, in addition, to monitor the progress of a letter in the feed branch 23 between two consecutive buffer gates 26.

The branch gate control 91 already described in E.5.4 may be regarded as a stripped-down buffer control since it can be simply realized by removing from the buffer control the superfluous tasks relating to controlling the branch gate such as the entire process R and everything in the processes Q and S concerned with the actual letter storage in, and letter discharge from, the buffer pockets.

In the above, the buffer control has been described in a manner such that the control of the associated buffer gate 26 is fully integrated in it. This control may, however, also be incorporated as a separate buffer gate control in the first process signal connection 6 and added directly to the buffer gate. The function of such a separate buffer gate control may be chosen so as to be virtually identical to that of the branch gate control 91.

5.6 Pocket control

During the operating process, each pocket control 33 of a pocket 28 has to be able to perform the following tasks:

providing the communication with the buffer control 38 via the common signal bus 37; this comprises: normal communication:

receiving a command to feed a letter into the pocket and causing it to be carried out;

detecting and signalling that the letter has been stored in the pocket;

receiving a command to discharge a stored letter and causing it to be carried out;

detecting and signalling that the letter has left the pocket; and dealing with faults:

detecting and signalling the occurrence of blockages;

detecting and signalling that the control of a subsequent pocket has not reacted to a message via the parallel section B1 of the common bus 37;

controlling the branch gate 29:

opening the branch gate 29 by means of an "open" signal via the control line 34 for the branch gate drive 30 when an instruction to feed in a letter has been received;

controlling the branch gate by means of a "closed" signal via the control line 34 for the gate drive 30 when a signal has been received via the detection line 36 of the pocket photodetection means 32 that a letter has arrived in the pocket;

controlling the motor 31 by means of sending start and stop signals over the control line 35 to the motor 31 for starting and bringing the pocket conveyor cord 54 in a defined manner to the speed of the transport cords 72 in the buffer feed track 21 if a letter has to be fed into the pocket;

decelerating in a defined manner and stopping the pocket conveyor cord 54 after the letter has been detected by the pocket photodetection means 32;

starting and bringing the pocket conveyor cord 54 in a defined manner to the speed of the discharge track 22 in order to discharge a letter:

stopping the pocket conveyor cord 54 if the letter has left the pocket;

dealing with signals received via the detection line 36 as a consequence of light/dark changes detected with the pocket photodetection means 32.

Bringing to speed and decelerating again "in a defined manner" is understood to mean, as already indicated above, that the speed of the motor 31 is regulated (in a way which is, however, known) in a manner such that slip is prevented from occurring between the letter and the pocket conveyor cord 54 and the deceleration and starting behaviour of the letter thus becomes undefined.

5.7 The initiation process

The operating phase of a buffer system according to the invention, in which the buffer process is therefore carried out, is preceded by an initiation phase. In said initiation phase, the initiation process in which it is determined which components of the buffer system are functioning properly and can be switched to the operating phase is carried out. Each control comprises a subprocess, a task, or a program which in some way takes part in the initiation process. The application control in the application control device 5 starts the initiation process in principle at a command received via the control entrance 10 for external control by transmitting, via the forward path 6.1 of the first process signal connection 6, a message INIT1 to the first control component situated downstream. Unless the storage medium comprises only one branch, said first control component is a branch gate control 91. Said INIT1 message has the following appearance:

*INIT1*
 *= <SOR><INIT1-TAG><W/M><WIS-*
 *SELNR><BUFFERNR><EOR>* where:

SOR = Start of Record character,

EOR = End of Record character,

INIT1-TAG = indication of the INIT1 message,

WISSELNR = position for the number of a gate, initial value = 0,

BUFFERNR = position for the number of a buffer, initial value = 0,

W/M = indicates whether the message is intended for a gate (W) or a buffer (M).

The various control components react to a said message as follows:

Branch gate control: each branch gate control 91 increases the gate number after receiving INIT1, i.e.

*WISSELNR (gate number) = WISSELNR + 1*, and then transmits a modified INIT1 message downstream in each of two possible gate directions where W/M=W, to the subsequent branch gate control, and where W/M=M, to the first buffer in a branch, and upstream in the direction of the application control device 5 where W/M=W (transmitted therefore by a gate).

For a certain time, each branch gate control waits for an answer from the two directions downstream. If no answer ensues within the specified time, the branch gate control transmits a fault signal upstream to the application control:

*FOUT*
 *(fault= <SOR> <FOUT−TAG> <FOUT-CODE> <WISSELNR> − <BUFFERN-R> <EOR>* where:

FOUT-TAG = indication of the FOUT (fault) signal,

FOUTCODE = code of the type of fault which has been detected, it being possible to deduce from WISSELNR and BUFFERNR which control component has detected the fault. Fault signals transmitted upstream and received are transmitted further upstream without delay. From answers which have in fact been received on time, the branch gate control deduces that it is or is not the last branch gate control in the storage medium 3. This conclusion is necessary since two different feed branches 23 are connected to the last branch gate.

Buffer control: After receiving the INIT1 message, each buffer control 38 increases the buffer number by

*BUFFERNR (buffer number) = BUFFERNR + 1*

After this increment, this is its own buffer number (=own buffer control number). This number is stored together with the branch gate number WISSELNR (=branch gate control number). The buffer control then transmits the INIT1 message modified in this way downstream to the next buffer control of the buffer in the same feed branch 23. Said modified INIT1 containing, in addition, also W/M=M is also transmitted upstream in the direction of the application control device 5. Each buffer control 38 waits for a certain time for an answer from the next buffer control downstream. If no answer ensues within the specified time, the buffer control 38 transmits a fault signal FOUT, which is identical to the one which a branch gate control 91 transmits in fault situations, upstream in the direction of the application control device 5.

Every final buffer control 38' (i.e. belonging to the last buffer 20' in a feed branch 23) in a side branch of the first process signal connection 6 receives its own transmitted INIT1 message back again via the end of branch detection means 93, and from this it can deduce that it is the last buffer control in the side branch. That a buffer control 38 with its buffer 20 is located in the last feed branch 23' can be deduced from the fact that W/M=W in the INIT1 message received. After it has established on the basis of the answers received on time that all the components in its immediate environment are functioning properly, each buffer control starts an internal initiation cycle. During such a cycle, the number of branches the buffer comprises is established. After carrying out said initiation cycle, every final buffer control 38' transmits upstream, via the return path 6.2 of the first process signal connection 6, a message containing the number of pockets its last buffer 20' contains:

*INIT2 = <SOR> <INIT2−TAG> <WISSELN-R> <BUFFERNR> − <#−VAKKEN> <E-OR>* where:

INIT2-TAG = indication of the INIT2 message,

WISSELNR = contains the number of the branch gate at the beginning of the feed branch, BUFFERNR = contains the number of the last buffer in the feed branch,

-VAKKEN = number of pockets. The contents of WISSELNR and BUFFERNR are not changed again upstream in the same feed branch. Every consecutive buffer control upstream which receives said INIT2 message stores the received level of the number of pockets #-VAKKEN, increases #-VAKKEN by its own number of pockets and then transmits said INIT2 message modified in this way further upstream.

A branch gate control which receives said INIT2 messages from both gate directions, stores the two levels of #-VAKKEN, i.e. the numbers of available pockets in said gate directions. It then transmits a modified INIT2 message further upstream in which #-VAKKEN is the sum of the two numbers received and the contents of WISSELNR and BUFFERNR have the highest value which has been received from each of the two directions. After the application control has received the INIT2 message, it derives from it a number of data. These are transmitted with a number of other data in an INIT3 message (see below) downstream via the forward path 6.1 of the first process signal connection 6 to the first branch gate control 91 of the storage medium 3:

*INIT3 = <SOR> <INIT3−TAG> <MAX−WIS-SEL> <MAX-BUFFER> <LM1> − <LM-2> <LT1> <LT2> <LF1> <LF2> <EOR>* where:

MAX-WISSEL = the number of branch gates 29 in the storage medium 3,

MAX-BUFFER = maximum number of buffers 20 in a feed branch 23,

LM1 = distance between pockets at the discharge side of a buffer,

LM2 = distance between the last pocket 28' in a buffer 20 and the discharge branch 24, LT1 = mutual distance between the buffers in a feed branch 24, LT2 = distance between the last buffer 20' in a discharge branch 24 and the main discharge track 8, LF1 = mutual distance between the discharge branches 24 in the main discharge track 8, LF2 = distance between the last discharge branch 24' and a defined ejection point X in the main discharge track 8.

Said first branch gate control and every subsequent branch gate control transmits the INIT3 message unaltered onwards in both gate directions. Each buffer control which receives said INIT3 message stores the data received therewith and then transmits the message unaltered onwards downstream until the buffer control of the last buffer 20' in each feed branch 23 is reached.

Each buffer 20 can use these data in the operating phase, that is to say during what has been described as the buffer process, to determine for each letter to be ejected how long it will require to reach the ejection point X in the main discharge track 8 from the pocket in which it is stored. The INIT3 message is also sent via the second process signal connection 9 to the product control 94 so that the latter can make use of these data, during the actual operating phase, for calculating the time instants TI at which the letters to be ejected must be at the ejection point X.

5.8 Message exchange during the buffer process

The buffer process comprises the totality of processes which are carried out during the operating phase of the buffer system in relation to the input, the storage and the ejection of letters. As has been described above with reference to FIG. 1, every letter which passes the sensing means 2 in the main feed track 1 and for which the application control device 5 receives object signals BS, is assigned a unique internal code as letter identification code BIC, for example a sequence number of six figures, in said device. The object signals BS are such that the length of the letter BL can also be deduced therefrom. The corresponding letter logging signals BBS are transmitted by the application control via the forward path 6.1 of the first process signal connection 6 in the direction of the storage medium 3 in the following message form:

$BBS = <SOR><BBS-TAG><BIC><BL><EOR>$ where:
BBS-TAG = indication of the letter logging message,
BIC = letter identification code,
BL = length of letter. Said message BBS traverses, via the forward path 6.1 of the first process signal connection 6, that path which corresponds to the conveyance path of the letter. Every branch gate control 91 which receives said message reduces by one the number, retained by it, of available pockets downstream in the direction in which the letter is sent and also transmits the message unaltered. The same is done by every buffer control 38 of the buffer 20 into which the letter is not input. The buffer control of the buffer 20 in which the letter is input and stored transmits a signal INVAK indicating this upstream via the return path 6.2 of the bidirectional connection:

$INVAK = <SOR><INVAK-TAG><BIC><EOR>$ where:
INVAK-TAG = indication of the INVAK signal. If a last buffer 20' of a feed branch 23 is not capable of storing a letter in one of its pockets, it sends a signal OVERLOOP indicating this upstream:

*OVERLOOP*
$(overflow) = <SOR><OVERLOOP-TAG><BIC><EOR>$ where:
OVERLOOP-TAG = indication of the OVERLOOP (overflow) signal.

If and wherever faults occur in the system which may disrupt the progress of the buffer process, the control component which detects said fault transmits a fault signal FOUT which is identical to the one which has already been described in the description of the initiation process above. Faults may also occur which are not directly disruptive for the buffer process. These are not signalled to the application control. If, for example, a pocket is no longer functioning, the entire system can remain fully in operation, albeit that the storage capacity has decreased somewhat. Fundamental faults, i.e. faults which make it impossible for letters to reach the ejection point X in the main discharge track 8 from the main feed track 1 via a pocket are, however, always transmitted to the application control.

During the operating phase, the product selection process M of the application control generates messages which are sent via the unidirectional second process signal connection 9 to the product control 94. These messages have the following appearance:

*PRODUKT*
$(product) = <SOR><BN><BIC-[1]><BIC-[2]> ----- <BIC-[BN]><EOR>$ where:
BN = number of letters which have to be ejected,
BIC-[n] = letter identification code of the nth letter (n=1,2,--,BN) from the series of BN letters which have to pass the ejection point X in the main discharge track 8 when ejected in the sequence in which the BICs occur in the message.

Starting from the desired sequence for each letter, the product control 94 calculates a time instant TI-[n] at which said letter has to pass the ejection point X, and then transmits the message:

*TIJDPRODUCT* $(time$
$product) = <SOR><BN><BIC-[1]><TI-[1]> --- <BIC-[BN]><TI-[BN]><EOR>$ via the main branch 9.1 and the side branches 9.2 of the unidirectional connection 9 inside the storage medium 3 to all the buffer controls 38. In addition, the product control 94 sends a clock signal code:

$<TIME-TAG>$ at fixed time instants, for example every 50 ms, for synchronization purposes to all the buffer controls via the unidirectional connections. Related to said clock signal code, which may or may not form part of the TIJDPRODUCT message, are the time instants TI-[n]. Every buffer control 38 then selects a message TIJDPRODUCT received those letters which are stored in pockets 28 of its buffer 20 and calculates on the basis of the parameters obtained during the initiation phase the time instants at which the pocket controls 33 of the respective pockets 28 have to give an instruction via the control lines 35 to start the motors 31 in order to discharge the desired letters on time. The buffer control sends a message upstream, relating to the number of pockets which are actually freed on receiving TIJDPRODUCT message, via the return path 6.2 of the bidirectional connection 6 to the application control:

*VAKLEEG* $(pocket$
$empty) = <SOR><VAKLEEG-TAG><#-LEEG>-<EOR>$ where:
VAKLEEG-TAG = indication of the VAKLEEG message,

-LEEG = number of pockets which have been freed inside the buffer after receiving the most recent TIJD-PRODUCT message.

Every buffer control 38 and every branch gate control 91 uses the contents (i.e. #-LEEG) of said message to update the number, stored by it, of available pockets #-VAKKEN upstream and then sends said message unaltered further upstream.

6. Central v. local pocket assignment

In the embodiment described above of the buffer system, the pocket assignment is carried out by the buffer control of the buffer in which the letter ultimately arrives. The controls of the gates in the feed path passed on the way have at the same time successively determined which buffer it is since the choice of the direction in which a letter is sent out depends on the number of free pockets which are present at that instant in either of two gate directions. Such a pocket assignment has the advantage that the letters are always directed in the direction of the majority of free storage locations. This achieves the result that the letters are always uniformly distributed during the operating process, which prevents certain conveyance and storage means being more heavily loaded than others in the course of time and therefore wearing out sooner. This is, in particular, an advantage in systems having a large storage capacity. A disadvantage is, however, that a direction has to be chosen even if no storage capacity is present in either of two gate directions at that instant. If in the meantime a storage location becomes free but exactly in the other gate direction to the one chosen, the letter in question becomes in fact an overflow letter. This problem does not arise if the pocket assignment is carried out centrally by the application control in accordance with a reservation principle. The latter assigns for this purpose not only the letter identification code BIC but also a unique pocket identification code VIC to every letter fed in and then has to update for the entire system where the letters are stored. Said pocket identification code VIC now also forms part of the letter logging signals BBS. Decisions at the branch gates and the buffer gates relating to the direction in which letters have to be sent are now taken on the basis of the pocket identification code VIC encountered in the letter logging signals BBS. The former preferably comprises for this purpose a unique buffer number combined with a unique pocket number inside said buffer. The unique buffer number preferably comprises in its turn the number of the branch gate WISSELNR, as determined during the initiation phase, combined with the number of the respective buffer in that branch.

In a buffer system with local pocket assignment, the initiation process can in principle be kept the same as described above for a system with central pocket assignment. In the buffer process, however, the INVAK, VAKLEEG and OVERLOOP messages can be omitted. The messages PRODUCT and TIJDPRODUCT relating to letter discharge now contain for every letter to be discharged and having letter identification code BIC-[n], in addition, the pocket identification code VIC-[n] of the pocket in which the respective letter is stored.

Since the application control in the central pocket assignment described has continuously to update the latter for the entire system, this control has, however, a much more difficult task. The advantages of a central pocket assignment over a local assignment are therefore well expressed only in relatively small storage systems.

7. The buffer system as sorting system

If the buffer system is designed as a letter sorting system, the ordering process L (see under E.5.2. The application control) is a sorting process which sorts the stored letters for certain letter features. This may imply sorting for address code, such as postcode, which is present for this purpose, for example, in the form of a bar code on every letter to be fed in. The sensing means are at the same time equipped with detection means known per se with which not only the length of the letter BL can be detected, but also with which the bar code can be read and interpreted. These data obtained in this way are then transmitted as the object signals BS to the application control device 5.

For a sorting system, the buffer system preferably has a large number of storage locations, for example 12 buffers each containing 64 pockets, with a local pocket assignment.

It is precisely in a sorting system of some size that the function of the product selection process can show up well. If a large number of letters are always stored at the same time, there is also always a high probability that the product selection process M can select therefrom sizeable numbers of letters whose address codes are identical e.g.: in a first part, and next can give them a particular order within the message PRODUKT on the basis of a second part of the address codes. These letters which are selected and ordered in this way can be regarded as a "product", for example bundled together, after being discharged from the system.

8. The buffer system as a video coding system

A video coding system based on a buffer system according to the invention may in principle be identical diagrammatically to FIG. 1 if the sensing means 2 in it are replaced by the video image pick-up and display section of the video coding system as known from the above cited publication C.(3). Said pick-up and display section comprises (1) a video image pick-up tube sited along the main feed track 1 for picking up the video images of passing letters.

(2) one or more video coding stations, each comprising a display screen with associated keyboard for presenting the video images of, in particular, the address data on said letters and for manually keying in an address code for each letter corresponding to the address data of the letter presented, and (3) a video image control which is coupled to the video image pick-up tube and to each of the video coding stations and which receives the video images consecutively and presents them at a free video coding station. The object signal connection 4 is now a bidirectional signal connection between the video control and the application control device 5. After receiving a new video image, the video control sends via said signal connection 4 object signals BS which are derived therefrom and which contain, for example, only the length of letter BL, to the application control. In addition to corresponding letter logging signals BBS via the first process signal connections 6, the application control now also sends by return a letter identification code BIC via the return path of the signal connection 4. The video control adds the BIC received to said new video image which has in the meantime been, or subsequently is presented, at a free video coding station. If the address code corresponding to said new video image has been received from said free station, the video image control then sends it with the BIC added via the connection 4 to the application control device. In the application control, the input logging process K (see E.5.2 above) can now establish that said letter is ready for sequence determination for the purpose of discharge and said BIC is placed along with the associated address code in the discharge table AT.

To print an address code on a respective letter, a code printer 95, which is connected by means of a write signal connection 96 to the application control device 5, is sited alongside the main discharge track 8 near the ejection point X. Both code printer 95 and the write signal connection 96 are shown in FIG. 1 by a dotted line.

For the number of storage points in such a video coding system, a choice of 2 to 3 per video coding station connected is in general sufficient so that, compared with a sorting system, a comparatively small storage system is involved here. A central pocket assignment is therefore preferred in this case. The ordering process L in the application control can be so chosen that the BICs in the table AT are always arranged in the sequence of the distance from the storage location to the system ejection point X. The product selection process M only selects therefrom the BICs of the letters one by one for discharge, for example, with intervals such that the sequence in which the discharge instructions are transmitted to the product control 94 corresponds to the sequence in which the discharged letters pass the ejection point X. The address codes can then also be presented in the same sequence by the product selection process M to the code printer 95 via the write signal connection 96, and it is possible to achieve the result with the known technique that each of said address codes is applied by the code printer 9 at the correct instant to the correct letter.

In another arrangement of a video coding system, the video image control may also be integrated in the application control.

The video coding function can, of course, also be combined with the sorting function by suitable adaptation of the application control.

We claim:

1. Buffer systems for carrying out a buffer process comprising feeding flat objects, such as letters, provided with scannable symbols, in an unordered sequence, temporarily storing them and discharging them in an ordered sequence, which buffer system comprising
storage means for temporarily storing the objects fed in,
a means feed track along which the objects are fed from a system inlet in the direction of the storage means,
a main discharge track along which the objects are discharged from the storage means in the direction of a system outlet,
system control means for controlling the carrying out of the buffer process,
object signalling means incorporated at the system inlet which send object signals to the control means via an object signal connection from each object fed via the system inlet,
the system control means comprising
storage control means for controlling the storage means,
process control means for receiving the object signals and for continuously determining which objects are fed, stored and discharged,
first and second process signal connections which connect the process control means to the storage control means;
characterized
in that the storage means include a number of parallelly ordered storage locations for receiving, temporarily retaining and ejecting every object individually;
the process control means including means for
assigning an object identification code to each object on receiving the associated object signals,
compiling object logging signals and transmitting then via the first process signal connections, which object logging signals contain the object identification code of an object which has to be stored,
receiving storage indication signals via the first signal connections, which storage indication signals contain the object identification code for each stored object, and
compiling process control signals and transmitting them over the second process signal connections, which process control signals contain the object identification code of each object which has to be discharged, and
the storage control means includes means for
causing objects to be stored in the storage means in an individually identifiable manner on receipt of object logging signals received via the first process signal connections, and
compiling the storage indication signals and transmitting them via the first signal connections to the process control means, and
causing stored objects to be discharged on the basis of the process control signals received via the second process signal connections.

2. Buffer system according to claim 1, characterized in that
the storage means comprise a number of buffers which are each provided with a buffer feed track connected to the main feed track, a number of individually controllable buffer pockets, and a buffer discharge track connected to the main discharge track,
the storage control means comprise buffer control means for each buffer, under the control of which the buffer pockets of the associated buffer are able to receive an object from the buffer feed track, temporarily retain it and eject it in the direction of the buffer discharge track,
the main feed track comprises one or more branches to which the buffers are connected by means of their respective buffer feed tracks,
a branch gate corresponds to each branch in the main feed track and a buffer gate corresponds to each connection of the buffer feed track, with which gates objects can be selectively deflected towards the desired branch of the main feed track or in direction of the associated buffer feed track, respectively,
a gate control including means for is appended to each branch gate and each buffer gate,
the first process signal connections connect each gate control, on the one hand, to the gate control of the branch gate located immediately upstream in the main feed track or to the process control means if the gate is the first gate as viewed from the system inlet, and on the other hand, to the gate controls or the gate control and the buffer control means of the gates or gate and buffer situated immediately downstream in each of the gate directions, the second process signal connections connect the process control means to the buffer control means of each buffer, each gate control causing the gate to be set, on the basis of object logging signals containing an object identification code of a subsequent object approaching the gate downstream and received via the first process signal connections, in a certain gate position for said object, and sending the object logging signals relating to said object further via the first process signal connections in a direction corresponding to said gate position.

3. Buffer system according to claim 2, characterized in that the process control means comprise discharge process means for continuously selecting of object identification codes of stored objects which have to be discharged and for causing the selected object identification codes to be incorporated in the process control signals.

4. Buffer system according to claim 3, characterized in that said first process control signals for each of the objects to be discharged also contain a time indication for the determination, by the respective buffer control means, of the time instant at which an object to be discharged has to appear at the system outlet.

5. Buffer system according to claim 3, characterized in that the object signals comprise sorting characteristics, and the discharge process means perform said selecting, and determine a sequence of discharge on the basis of the sorting characteristics of the instantaneously stored objects.

6. Buffer system according to claim 2, characterized in that the buffer control means of each buffer comprise first processor means for retaining a buffer status relating to which object is stored in which buffer pocket and for delivering upstream, via the first process signal connections, a capacity signal which indicates the instantaneous storage capacity of the buffer after every change in the buffer status, every gate control comprises second processor means for retaining the instantaneous storage capacity downstream in each of the two gate directions on the basis of capacity signals received from both gate directions, determining the said gate position as a function of the instantaneous storage capacity downstream in each of the gate directions, and delivery upstream a capacity signal which indicates the sum of the storage capacities in each of the gate directions, via the first process signal connections.

7. Buffer system according to claim 6, characterized in that each buffer gate control is integrated in the buffer control means of the corresponding buffer.

8. Buffer system according to claim 2, characterized in that every pocket in the buffer system is identifiable for the process control means by means of a pocket identification code, pocket assignment means are included in the process control means for assigning a free pocket to each object to be stored by adding the pocket identification code of a free pocket to the object identification code in the object logging signal, each gate control determines said gate position on the basis of the pocket identification code encountered in the object logging signal, and each buffer control causes an object to be stored in the free pocket determined with the pocket identification code encountered in the object logging signal.

9. Buffer system according to claim 8, characterized in that the pocket identification code comprises a buffer number code uniquely identifying a buffer and a pocket number code uniquely identifying a pocket inside a buffer.

10. Buffer system according to claim 8, characterized in that each buffer gate control is integrated in the buffer control means of the corresponding buffer.

11. Buffer system according to claim 2 characterized in that each said buffer comprises a number of deflection devices, corresponding in number to the number of associated buffer pockets and each said buffer control means include means for respectively feeding said flat objects, deflecting them from said buffer feed track in the direction of the respective associated buffer pocket, temporarily storing them and discharging them under the control of said buffer control means, each buffer pocket being provided with confining conveyance means, which are individually controllable by the buffer control means, for accepting an object, presented via a deflection device from the feed track to the corresponding buffer pocket, decelerating it, stopping it and retaining it for the temporary storage, while and for continuously confining said object, bringing said object up to speed again to discharge it from the buffer pocket and presenting it to the buffer discharge track.

12. Buffer according to claim 11, characterized in that the confining conveyance means confine the object concerned in a force-locked manner by lateral clamping.

13. Buffer according to claim 12, characterized in that the said confining conveyance means comprise an elongated entrainment device which can be driven in its longitudinal direction and has a high coefficient of friction with respect to the said flat objects, and also an elongated sliding device which is stationary at least in the longitudinal direction and has a very low coefficient of friction with respect to said flat objects, either the entrainment device, or the sliding device, or both being laterally resilient and the object concerned being clamped between the entrainment device and the sliding device.

14. Buffer according to claim 13, characterized in that the lateral boundary of each of the pockets is formed by partitions which are mutually sited in parallel and adjoin the feed track at an acute angle, every partition of two successive buffer pockets being provided with the entrainment device, which can be driven in its longitudinal direction, of one of the two successive buffer pockets and the elongated sliding device of the other of the two successive buffer pockets.

15. Buffer according to claim 14, characterized in that the said entrainment device is formed by at least one endless cord which is connected to a driving device and which extends essentially in a plane parallel to the plane of advance of the said flat objects.

16. Buffer according to claim 11, characterized in that the said feed track comprises an elongated entrainment device which can be driven in its longitudinal direction and has a high coefficient of friction with respect to the said flat objects, and also a sliding device which extends over the entire length where buffer pockets adjoin the feed track, is stationary at least in the longitudinal direction and has a very low coefficient of friction with respect to said flat objects, either the entrainment device, or the sliding device, or both being laterally resilient, and for the purpose of conveyance along the feed track, each object being clamped between the entrainment device and the sliding device of the feed track.

17. Buffer according to claim 16, characterized in that the deflection devices form part of the feed track and each comprise a deflection part having a face provided with sliding means at the side of the said entrainment device and a deflection face at the side of the associated buffer pocket, one end of which deflection part being laterally swivellable around a swivel axis between a first discrete position and a second discrete position, the said end of the deflection part not intersecting the plane of advance of the flat objects in the first discrete position and said end in fact intersecting said plane of advance at a certain deflection angle in the second discrete position, the said sliding device being segmented and being formed at least in part by the respective faces, provided with sliding means, of one or more deflection devices which are in the first discrete position.

18. Buffer according to claim 17, characterized in that the said deflection devices each comprise a guiding part forming a single whole with the said swivellable deflection part by means of an elastic zone and permanently attached to the respective buffer pocket.

19. Buffer system according to claim 18, characterized in that the deflection parts each comprise a driving part forming a single whole with the deflection part by means of an elastic zone, which driving part is connected at the other side to a driving device.

20. Buffer according to claim 11, characterized in that the said discharge track comprises an elongated entrainment device which can be driven in its longitudinal direction and has a high coefficient of friction with respect to the said flat objects and also a sliding device which extends over the entire length where buffer pockets debouch into the discharge track, is stationary at least in the longitudinal direction and has a very low coefficient of friction with respect to said flat objects, either the entrainment device, or the sliding device, or both being laterally resilient and, for the purpose of conveyance from one of the buffer pockets along the discharge track, each object being clamped between the entrainment device and the sliding device of the discharge track.

21. Buffer according to claim 11, characterized in that the buffer control means for each buffer pocket comprise a pocket control for controlling the confining conveyance means and the associated deflection devices, which pocket controls are under the command, via a common parallel bus connection, of a central buffer control which also forms part of the buffer control means.

22. Video coding system for providing objects with an object code for the purpose of automatically processing said objects, comprising:
storage means including a number of parallelly ordered storage locations for receiving, temporarily retaining and discharging each object individually;
a main feed track along which the objects are fed from a system inlet in the direction of the storage means,
a main discharge track along which the objects are discharged from the storage means in the direction of a system outlet,
storage control means for controlling the storage means,
process control means for continuously determining which objects are fed, stored and discharged,
video image pick-up means positioned at the system inlet for picking up video image signals from passing objects,
one or more video coding stations for displaying said object video images and for keying in object codes,
video image control means for receiving the video image signals, for deriving object signals from the received video image signals and sending them to the process control means, for causing the object video images to be displayed, and for receiving the object codes keyed in,
code printing means positioned near the system outlet for applying the object code to objects passing the code printing means and connected to the process control means by a write signal connection,
a bidirectional connection between the video control means and the process control means,
first and second process signal connections which connect the process control means to the storage control means;
said process control means including means for
receiving the object signals via the bidirectional connection,
assigning an internal object identification code to each object on receiving the associated object signals,
compiling object logging signals and transmitting them via the first process signal connections, which object logging signals contain the object identification code of an object which has to be stored,
receiving storage indication signals via the first signal connections, which storage indication signals contain the object identification code for each stored object, and
compiling process control signals and transmitting them over the second process signal connections, which process control signals contain the object identification code of each object which has to be discharged, and
despatching the process control signals with said object identification codes in order to cause the objects corresponding to said object identification codes to be discharged, and
presenting the object codes via the write signal connection to the code printing means in a sequence corresponding to that in which the objects are discharged,
said video image control means including means for
receiving the object identification codes assigned by the process control means via the bidirectional connection, and
sending back to the process control means the object identification codes, each together with the corresponding object code keyed in, via the bidirectional connection,
and the storage control means including means for causing objects to be stored in the storage means in an individually identifiable manner on receipt of object logging signals received via the first process signal connections, compiling the storage indication signals and transmitting them via the first signal connections to the process control means, and causing the objects stored therein in an individually identifiable manner to be discharged on the basis of the process control signals received via the second process signal connections.

23. Video coding system for providing objects with an object code for the purpose of automatically processing said objects, comprising:

a main feed track along which the objects are fed from a system inlet, a main discharge track along which the objects are discharged in the direction of a system outlet, storage means including a number of parallelly ordered storage locations for receiving, temporarily retaining and discharging each object individually, which storage means comprise a number of buffers which are each provided with a feed track connected to the main feed track, a number of individually controllable buffer pockets, and a discharge track connected to the main discharge track, storage control means for controlling the storage means, which storage control means comprise buffer control means for each buffer, under the control of which the buffer pockets of the associated buffer are able to receive an object from the feed track, temporarily retain it and eject it in the direction of the discharge track, the main feed track comprises one or more branches to which the buffers are connected by means of their respective feed tracks, a branch gate corresponds to each branch in the main feed track and a buffer gate corresponds to each connection of the feed track of a buffer, with which gates objects can be selectively deflected towards the desired branch of the main feed branch or in the direction of the associated feed branch, respectively, a gate control is appended to each branch gate and each buffer gate, process control means for continuously determining which objects are fed, stored and discharged, video image pick-up means positioned at the system inlet for picking up vide image signals from passing objects, one or more video coding stations for displaying said object video images and for keying in object codes, code printing means positioned near the system exit for applying the object codes to the objects passing the code printing means, first process signal connections which connect each gate control, on the one hand, to the gate control of the branch gate located immediately upstream in the main feed track or to the process control means if the gate is the first gate as viewed from the system inlet, and on the other hand, to the gate controls or the gate control and the buffer control means of the gates or gate and buffer situated immediately downstream in each of the gate directions, second process signal connections, which connect the process control means to the buffer control means of each buffer, said process control means including means for receiving the video image signals, assigning an internal object identification code to each object on receiving the associated video image signals, compiling object logging signals and transmitting them via the first process signal connections, which object logging signals contain the object identification code of an object which has to be stored, causing the video image signals of an object to be presented at an available video coding station and receiving the object code keyed in, continuously selecting of object identification codes of stored objects which have to be discharged, receiving storage indication signals via the first signal connections, which storage indication signals contain he object identification code for each stored object, and compiling process control signals and transmitting them over the second process signal connections, which process control signals contain the selected object identification code of each object which has to be discharged, and a time indication for the determination, by the respective buffer control means, of the time instant at which an object to be discharged has to appear at the system outlet, and causing said object code to be applied with the code printing means at a time instant derived from the time instant at which the object must be at the system outlet, each gate control including means for causing the gate to be set, on the basis of object logging signals containing an object identification code of a subsequent object approaching the gate downstream and received via the first process signal connections, in a certain gate position for said object, and sending the object logging signals relating to said object further via the first process signal connections in a direction corresponding to said gate position, and the buffer control means of each buffer including means for causing objects to be stored in free buffer pockets in an individually identifiable manner on receipt of object logging signals received via the first process signal connections, compiling the storage indication signals and transmitting them via the first signal connections to the process control means, and causing, on the basis of the received process control signals, the objects stored therein in an individually identifiable manner to be discharged on moments derived from the time indications in order to let arrive them at time instants at the system outlet as determined by the process control means.

* * * * *